United States Patent
Schmoll

(10) Patent No.: US 10,046,730 B2
(45) Date of Patent: Aug. 14, 2018

(54) SUPPORT ELEMENT FOR ABSORBING FORCES IN A VEHICLE

(71) Applicant: GM GLOBAL TECHNOLOGY OPERATIONS LLC, Detroit, MI (US)

(72) Inventor: Ralf Schmoll, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 15/131,531

(22) Filed: Apr. 18, 2016

(65) Prior Publication Data

US 2016/0304127 A1 Oct. 20, 2016

(30) Foreign Application Priority Data

Apr. 18, 2015 (DE) .................. 10 2015 004 983

(51) Int. Cl.
*B60R 22/18* (2006.01)
*B62D 25/00* (2006.01)

(52) U.S. Cl.
CPC .............. *B60R 22/18* (2013.01); *B62D 25/00* (2013.01)

(58) Field of Classification Search
CPC .................................. B60R 22/18; B62D 25/00
USPC ....... 296/187.09, 193.09, 193.01, 187.1, 205
See application file for complete search history.

(56) References Cited

U.S. PATENT DOCUMENTS

| 5,484,034 A | 1/1996 | Benz et al. | |
|---|---|---|---|
| 6,434,907 B1 * | 8/2002 | Simboli | B62D 21/09 296/146.6 |
| 2001/0050497 A1 * | 12/2001 | Jaekel | B62D 23/005 296/205 |

FOREIGN PATENT DOCUMENTS

| DE | 10212336 A1 | 10/2003 |
|---|---|---|
| DE | 102008009292 A1 | 8/2009 |
| DE | 102009015354 A1 | 9/2010 |
| DE | 102011104204 A1 | 12/2012 |
| DE | 102012019379 A1 | 4/2013 |
| DE | 102013019824 A1 | 7/2014 |
| EP | 1380495 A1 | 1/2004 |

OTHER PUBLICATIONS

Great Britain Patent Office, Great Britain Search Report for Great Britain Application No. 1605840.6, dated Aug. 5, 2016.
German Patent Office, German Search Report for German Application No. 1020150049816, dated Feb. 29, 2016.

* cited by examiner

*Primary Examiner* — Joseph Pape
(74) *Attorney, Agent, or Firm* — Lorenz & Kopf, LLP

(57) ABSTRACT

A support structure for absorbing forces in a vehicle includes a support element, which encloses a hollow space and includes a number of openings, which is delimited by one or more boundary faces. A receiving body for an assembly unit is inserted in one of the openings so that the receiving body at least partially projects into the hollow space. The receiving body includes a wall which at least in portions runs corresponding to the boundary faces and with which the receiving body makes contact with the boundary faces of the support element.

14 Claims, 3 Drawing Sheets

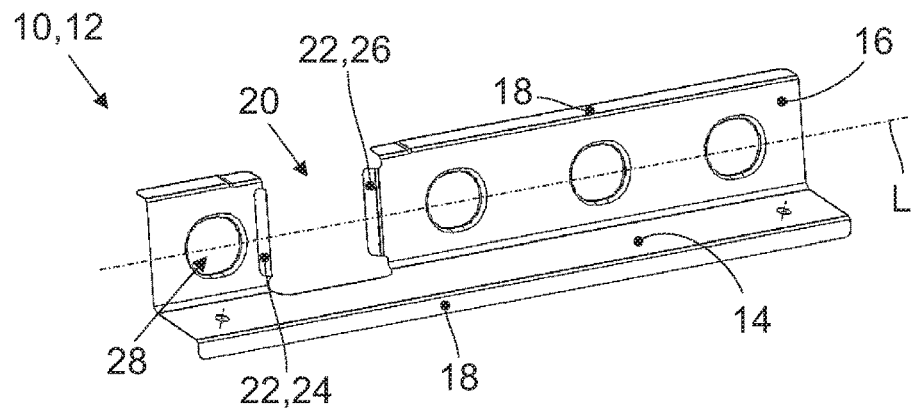
Fig.1
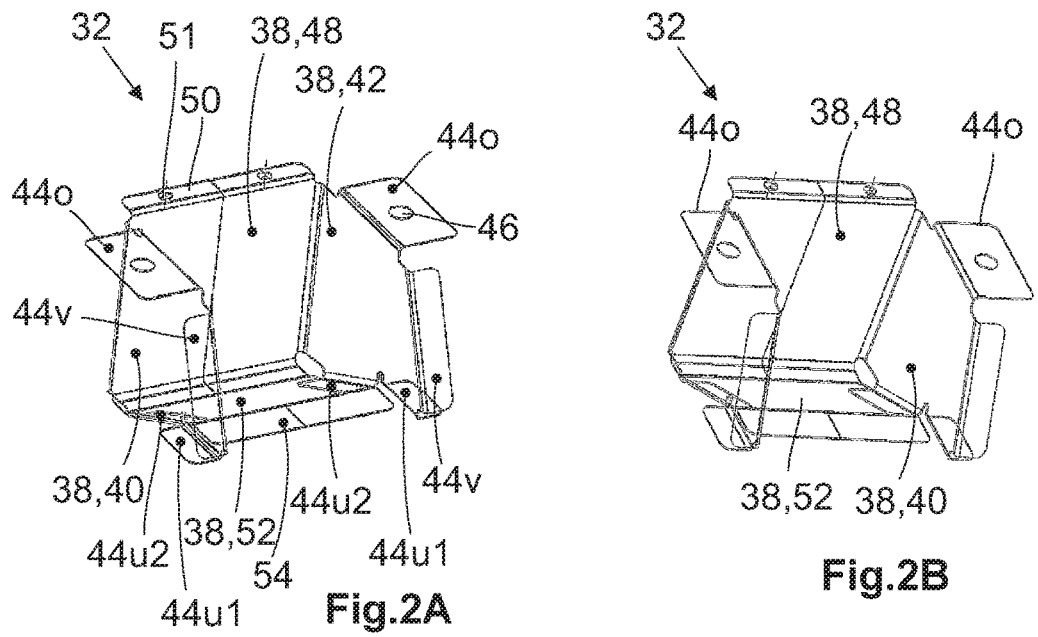
Fig.2A
Fig.2B
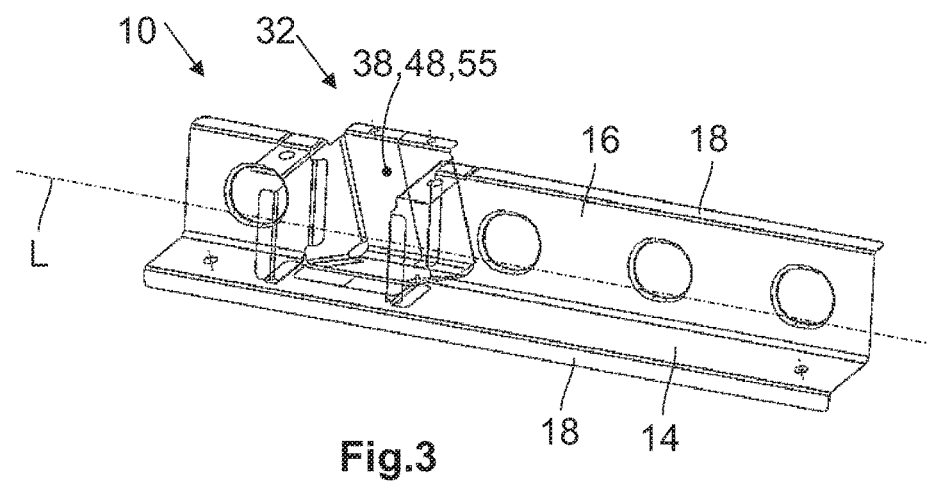
Fig.3

SUPPORT ELEMENT FOR ABSORBING FORCES IN A VEHICLE

CROSS-REFERENCE TO RELATED APPLICATION

This application claims priority to German Patent Application No. 102015004983.6, filed Apr. 18, 2015, which is incorporated herein by reference in its entirety.

TECHNICAL FIELD

The present disclosure pertains to a support structure for absorbing forces in a vehicle, and more particularly a support structure for simply mounting an assembly unit a hollow space that is enclosed by the support element, wherein the load-bearing capacity of the support element is to be diminished as little as possible.

BACKGROUND

The support structure of a vehicle includes a large number of support elements, for example side members and cross members as well as pillar elements which, depending on arrangement, can be connected to one another in various ways. Usually, the support elements are produced from hollow profiles that are opened or closed in the cross section, which enclose a hollow space. It is consequently opportune to arrange assembly units in this hollow space in order to be able to utilize the existing space in a vehicle which is naturally limited.

When utilizing the hollow space that is enclosed by the hollow profiles for arranging assembly units, for example an inertia belt reel, the following disadvantages may be experienced. On the one hand, arranging an assembly unit in a hollow space involves increased mounting expenditure, and on the other hand it is necessary to provide openings in the wall of the hollow profiles in order to introduce the assembly unit into the hollow space. Providing these openings however results in a weakening of the support element concerned, so that additional stiffeners and/or higher material thicknesses have to be provided or the dimension of the support elements have to be increased in order to again offset this weakening. However, by doing so the construction of the vehicle is rendered more complicated on the one hand and the weight of the vehicle is increased on the other hand, which, as part of the efforts of keeping the production simple and to reduce the fuel consumption, is counterproductive. In the case that the support element concerned is dimensioned larger, more installation space is additionally required so that the trunk or the occupant space is rendered correspondingly smaller.

DE 102 12 336 A1 describes a support element with an opening through which an assembly unit can be introduced into the hollow space. The weakening of the support element is offset in that the assembly unit is arranged fixed on a flat support plate. The support plate completely covers the opening and extends beyond it. In the overlapping part, the support plate is screwed to the support element. The support plate, on which the assembly unit is preassembled, is screwed onto the support element from the outside so that there is no interaction between the support plate and the boundary faces. As a result, the loads and stresses are transmitted to the support plate via connecting means such as screws so that the connection means are subjected to shearing, which can result in a failure of the connection. Here, the support plate is embodied continuously so that the selection of the possible assembly units that can be introduced into the hollow space with the solution described in DE 102 12 336 A1 is limited.

SUMMARY

In accordance with the present disclosure a support structure provides for the simple mounting of an assembly unit in the hollow space that is enclosed by the support element, wherein the load-bearing capacity of the support element is to be diminished as little as possible.

An embodiment of the support structure for absorbing forces in a vehicle according to the present disclosure includes a support element, which encloses a cavity and has a number of openings, which is bounded by one or more boundary surfaces. Furthermore, a receiving body for an assembly unit is inserted into one of the openings so that the receiving body at least partially projects into the cavity, wherein the receiving body includes a wall which at least in portions extend to the boundary faces and with which the receiving body makes contact with the boundary surfaces of the support element.

An aspect of the present disclosure resides in the fact that the receiving body interacts with the boundary faces which limit the openings. In contrast to conventional structures, the interaction of the boundary faces with the receiving body makes possible a largely uninterrupted transmission of the loads and stresses from the support element to the receiving body. Because of the arrangement of the receiving body in the support element according to the present disclosure, the receiving body fills out the opening at least partially, as a result of which significantly greater loads can be transmitted without a failure of the support element in the region of the openings occurring.

In addition, the receiving body projects into the hollow space at least partially and is thus a three-dimensional body. Because of this, the receiving body can be adapted to the form of the assembly unit, which is to be arranged in the hollow space, so that the assembly unit can be arranged and fixed in the hollow space in a space-optimized manner, which is only conditionally possible with a flat support plate.

The arrangement of the receiving body in the support element according to the present disclosure makes it possible to dimension the support element and thus the support structure smaller, so that installation space is saved.

It is opportune when the support element has a longitudinal axis and the receiving body includes a stiffening portion that runs substantially parallel to the longitudinal axis. When the support element is loaded, tensile or compressive stresses occur with respect to the longitudinal axis which, by means of the stiffening portion, which runs along the longitudinal axis, can be particularly well absorbed and passed on. Stress peaks are largely avoided so that the weakening of the support element, which is caused by the opening, is limited to a minimum. The stiffening portion can be configured rod or brace-like, so that, because of this, the production of the receiving body becomes only negligibly more expensive.

Another configuration of the support structure is characterized in that the opening is limited by a first boundary face and a second boundary face, which substantially run parallel to one another and the wall includes a first wall portion and a second wall portion, which substantially run parallel to one another, wherein the receiving body via the wall portions makes contact with the boundary faces of the support element. Because of the parallel course of the two boundary faces and of the wall portions it is possible to produce the receiving body from a flat stock material, for example by folding or bending a sheet metal piece, as a result of which the receiving body can be produced particularly easily and cost-effectively.

In a further development, the wall portions interact with the boundary faces in a frictionally joined manner when the receiving body is inserted in the opening. The frictional connection can for example be realized by way of a slight oversize of the receiving body with respect to the opening. Alternatively, the boundary faces can be slightly preloaded through a suitable orientation in order to realize the frictional connection. Because of this, prepositioning of the receiving body in the opening is achieved as a result of which the following operations for fastening are simplified.

The support structure according to the present disclosure is further developed in that the wall portions include one or more folded fastening portions, by which the receiving body is fastened to the support element. Through the possibility of folding the fastening portions, production is again kept simple. The receiving body can for example be welded or screwed to the support element via the fastening portions. In addition to this, the fastening portions can also be utilized in order to stiffen the receiving body within itself. As already explained, the receiving body can be produced by folding a flat metal sheet. The fastening portions of the areas created through the folding can be connected to adjacent wall portions for stiffening the receiving body, for example by way of welding. In addition to the fastening, the fastening portions also serve as stop face relative to the support element, so that the receiving body during the mounting can be easily positioned relative to the support element, which improves the production accuracy.

In a further design of the support structure, the support element of the support structure includes a first profile body and a second profile body, which are fastened to one another and which enter into contact with the wall of the receiving body. For example, two L-shaped profile bodies can be used which in the finish-assembled state give the support element a rectangular shape in cross section. The division of the support element into two parts has technical production advantages since the positioning and at least one preliminary fixing of the receiving body and the assembly unit can already be carried out in particular when the support element is not yet completely closed. Positioning and fixing are significantly simplified using the two-part configuration of the support element since the accessibility for tools and assemblers compared with a one-piece support element is significantly better. The production is simplified because of this.

It is opportune that the fastening portions include bores for fastening the receiving body on the support element. The bore can be used for example for riveting or screwing the receiving body to the support element. Both fastening types can be realized relatively easily and make possible providing a reliable connection via which major forces can be transmitted.

It is opportune, furthermore, when the assembly unit includes an inertia belt reel. Inertia belt reels are usually fastened to support elements from the outside, for example to side members or cross members in order to be able to securely introduce loads that occur during the operation of the vehicle, into the vehicle. However, the corresponding installation space has to be reserved for this purpose. According to the present disclosure it is now possible to provide the inertia belt reel in the hollow space of the support element concerned, as a result of which the installation space taken up by the inertia belt reel can now be used for other assembly units or is available for an enlarged trunk. In addition to this, the force introduction into the support element is better since the force need not be introduced into the support element by means of an external connection, but acts on the support element from the inside.

In addition, a further aspect of the present disclosure relates to a receiving body for receiving an assembly unit which can be inserted into an opening of a support element of a support structure according to one of the preceding exemplary embodiments, so that the receiving body at least partially projects into a hollow space which is enclosed by the support element, wherein the receiving body includes a wall with which the receiving body makes contact with the support element when the receiving body is inserted in the opening of the support element. The advantages and technical effects that can be achieved with the receiving body according to the present disclosure correspond to those which were described in the places concerned for the support structure according to the present disclosure.

In addition to this, a further aspect of the present disclosure relates to a vehicle with a support structure according to any one of the previously described embodiments. The advantages and technical effects that can be achieved with the vehicle correspond to those that were discussed for the support structure according to the present disclosure.

In addition, the present disclosure is further achieved by a method for assembling a support structure. A support element is provided, which includes a number of openings, which are limited by one or more boundary faces. A receiving body is inserted in the openings in such a manner that the wall of the receiving body makes contact with the boundary faces. The receiving body is fastened on the support element.

The advantages and technical effects that can be achieved with the method according to the present disclosure correspond to those that were discussed for the support structure according to the present disclosure. It is possible, in particular, to provide a receiving body for an assembly unit with which the assembly unit can be arranged in the hollow space that is enclosed by the support element, without the support element being substantially weakened because of this and without an increased mounting effort being necessary for this purpose.

The method according to the present disclosure, in which the support element includes a first profile body and a second profile body may be further developed. A receiving body is inserted in the opening of the first profile body. The receiving body is fastened on the first profile body. The second profile body is fastened on the first profile body.

For example, two L-shaped profile bodies can be used which in the finish-assembled state give the support element a rectangular shape in cross section. When the receiving body is fastened to the first profile body, both the receiving body and also the profile body are easily accessible since the second profile body is not yet fastened to the first profile body. It is not necessary for the receiving body to be fastened also to the second profile body, but which can be advantageous since the connection between the receiving body and the support element can thereby be improved.

An assembly unit is inserted in the receiving body, and fastening fastened thereto. These two steps can then be carried out already before the receiving body is inserted in the opening of the support element, provided the shape and the size of the assembly unit permit this. If this is not the case, the support element can be configured in two parts so that the receiving body is fastened to the first profile body before the second profile body is fastened to the first profile body. In this case, assembly units can be placed in the hollow space of the support element which are larger than the opening. The same applies also to the receiving body, which can extend beyond the opening along the longitudinal axis of the support element.

The assembly unit can also be configured so that it is at least partly not only fastened to the receiving body but also to the support element, as a result of which the assembly unit contributes to the positioning of the receiving body relative to the support element. In this way, a highly robust connection between the assembly unit and the receiving body and the support element is provided.

BRIEF DESCRIPTION OF THE DRAWINGS

The present disclosure will hereinafter be described in conjunction with the following drawing figures, wherein like numerals denote like elements.

FIG. 1 shows an extracted perspective front view of a first profile body of a support element of a support structure according to the present disclosure;

FIG. 2A shows a receiving body according to the present disclosure by way of a perspective front view;

FIG. 2B shows a receiving body according to the present disclosure by way of a perspective rear view;

FIG. 3 shows an extracted perspective front view of the first profile body of a support element of a support structure according to the present disclosure, on which a receiving body according to the present disclosure is fastened;

DETAILED DESCRIPTION

Figure 4A:
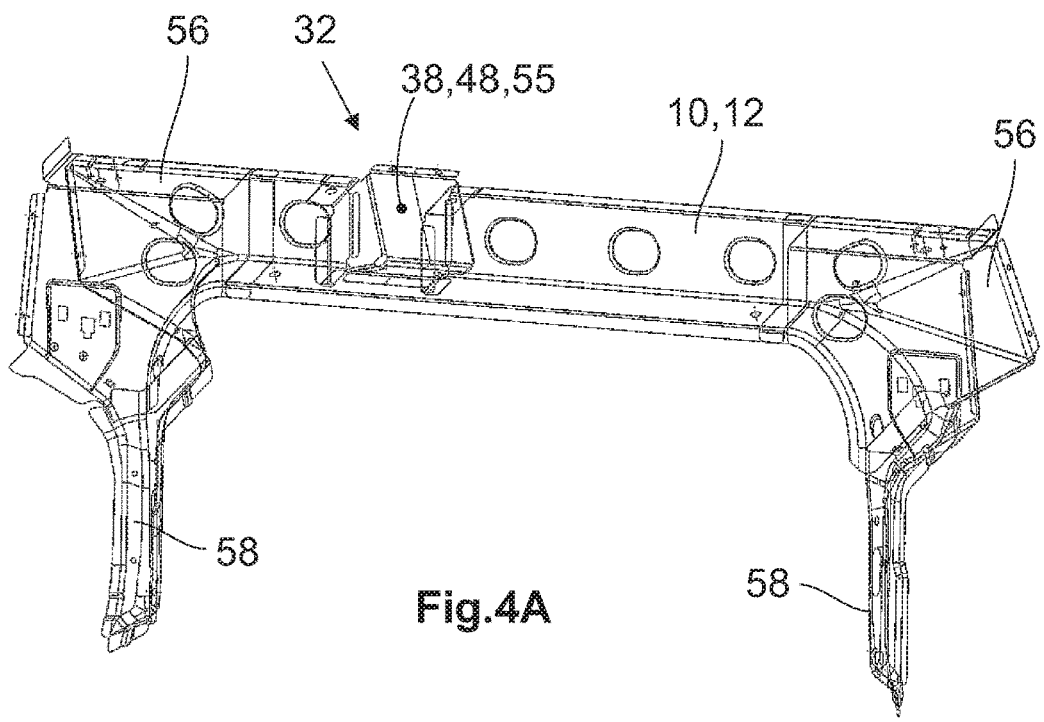
FIG. 4A shows the first profile body shown in the FIGS. 1 and 3 in the installed state by way of a perspective front view.

The following detailed description is merely exemplary in nature and is not intended to limit the invention or the application and uses of the invention. Furthermore, there is no intention to be bound by any theory presented in the preceding background of the invention or the following detailed description.

In FIG. 1, a first profile body 10 of a support element 12 according to the present disclosure is shown by way of an extract, wherein the first profile body 10 extends along a, longitudinal axis L and is of approximately L-shaped design. Consequently, the first profile body 10, based on the representation chosen in FIG. 1, forms a lower surface 14 and a rear surface 16, which on their free ends include folded end faces 18.

The first profile body 10 includes an opening 20, which in the shown example is merely located on the rear surface 16 and has a rectangular shape. The opening 20 is limited by a boundary face 22, in this case along the longitudinal axis L from a first boundary face 24 and a second boundary face 26, which are provided by folding the first profile body 10. The boundary face 22 however can also be formed by the wall of the support element 12 itself. The opening 20 is opened towards the folded end face 18 of the rear surface 16.

Furthermore, the support element 12 includes a number of four circular mounting openings 28, which for the present disclosure are of subordinate importance. The support element 12 according to the present disclosure additionally includes a second profile body 30, which is not shown here, but which is substantially constructed exactly like the first profile body 10 (see FIG. 5), wherein the opening of the second profile body 30 follows the opening 20 of the first profile body 10.

Figure 5:
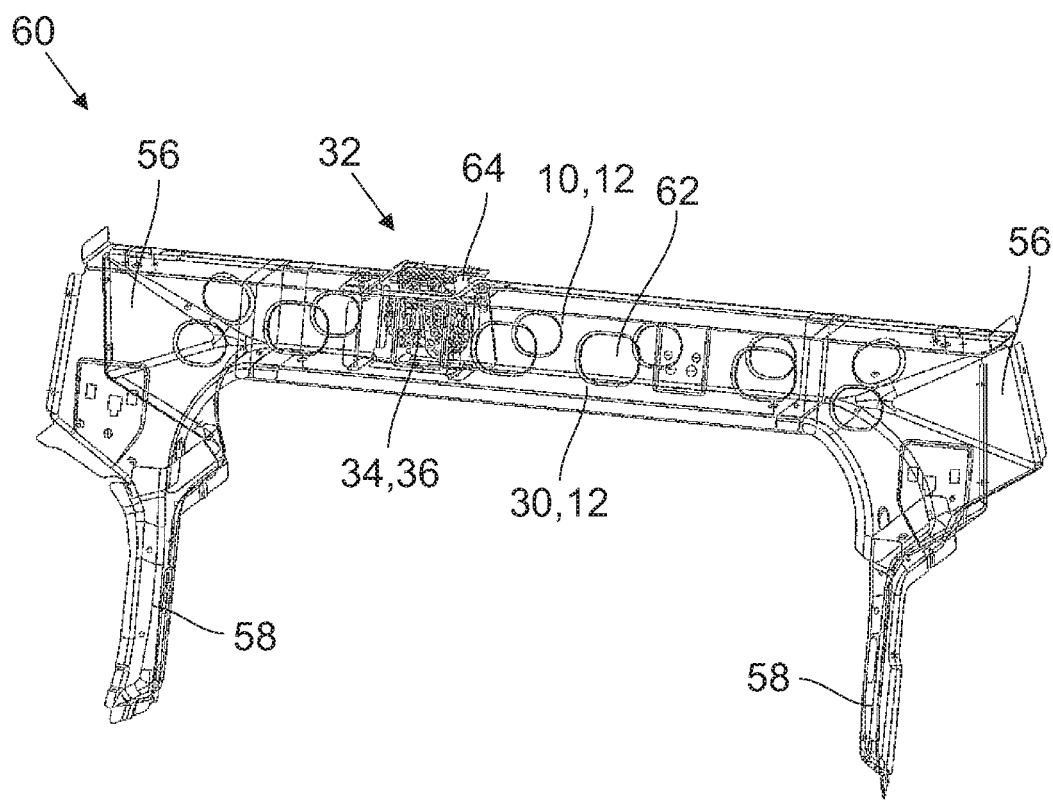
FIG. 5 shows a support structure according to the present disclosure in the finish-assembled state by way of a perspective front view.

In FIG. 2A, a receiving body 32 according to the present disclosure is perspectively shown from the front, which serves for receiving an assembly unit 34, for example an inertia belt reel 36 (see FIG. 5). The receiving, body 32 according to the present disclosure includes a wall 38 with altogether four wall portions, each of which are produced by folding a flat metal sheet. The wall 38 includes a first wall portion 40 and a second wall portion 42, which substantially run parallel to one another and each include folded fastening portions 44. In the shown exemplary embodiment, the first and the second wall portion 40, 42 each include an upper fastening portion 44$o$, a front fastening portion 44$v$ and a lower first fastening portion 44$u$1 and a lower second fastening portion 44$u$2. The upper, the front and the lower first fastening portion 44$o$, 44$v$, 44$u$1 face towards the outside while the lower second fastening portion 42$u$2 faces towards the inside. The two upper fastening portions 44$o$ each include a bore 46.

The two wall portions 40, 42 are connected to a third wall portion 48 which substantially runs perpendicularly to the two wall portions 40, 42. The third wall portion 48 includes a rear support portion 50, which faces towards the outside and includes two bores 51. Furthermore, a fourth wall portion 52 is present which with respect to the third wall portion 48 is inclined and includes a front support portion 54, which is likewise produced by way of folding and faces towards the outside. Since the lower second fastening portion 44$u$2 faces towards the inside, it makes contact with the fourth wall portion 52, so that the lower second fastening portion 44$u$2 can be connected to the fourth wall portion 52, for example by way of welding, as a result of which the receiving body 32 is stiffened within itself. In FIG. 2B, the receiving body 32 shown in FIG. 2A is shown from the back.

In FIG. 3, the receiving body 32 is shown fastened to the first profile body 30. It is evident that the fastening portions 44 facing towards the outside and the support portion 54 (see FIG. 2A) serve as support surface on the end face 18 of the rear surface 16 or on the lower surface 14 of the first profile body 10, as a result of which positioning of the receiving body 32 with respect to the first profile body 10 is achieved. In addition it becomes clear that the third wall portion 48 runs parallel to the longitudinal axis L of the first profile body 10 and thus continues the flow of forces in the first profile body 10 along the longitudinal axis L. Consequently, the third wall portion 48 acts as a stiffening portion 55, since it is assigned a decisive part in the stiffening of the first profile body 10 which is weakened by the opening 20. In addition it is evident that the receiving body 32, based on the representation selected in FIG. 3, projects towards the back beyond the rear surface 16. The reason for this is the size and the shape of the assembly unit 34 that is to be arranged in the receiving body 32.

Figure 4B:
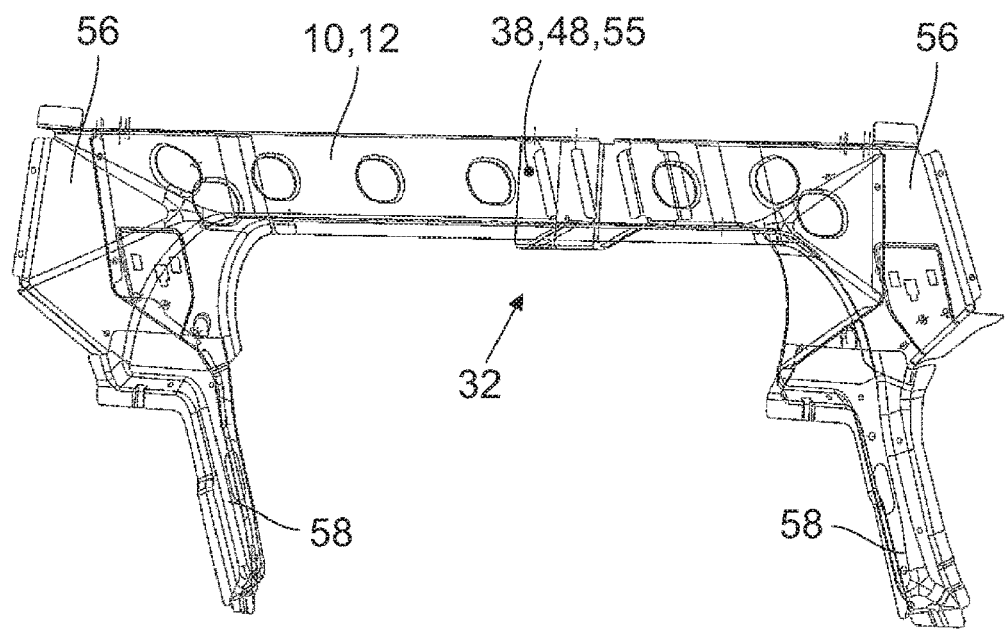
FIG. 4B shows the first profile body shown in the FIGS. 1 and 3 in the installed state by way of a perspective rear view.

In FIG. 4A, the first profile body 10 is shown in the installed state with the receiving body 32 fastened to it It is evident that the first profile body 10 at both its ends is connected to saddle-shaped connecting elements 56, for example by way of welding. The saddle-shaped connecting elements 56 in turn are connected with braces 58 and jointly form a part of a wheel house of a vehicle which is not shown in more detail here. In FIG. 4B, the component shown in FIG. 4A are shown from the back.

In FIG. 5, a support structure 60 according to the present disclosure is shown from the front in the finish-assembled state by way of a perspective representation. The second profile body 30 already mentioned previously is fastened to the first profile body 10 so that they enclose a hollow space 62 into which the receiving body 32 projects. In addition, the second profile body 30 is fastened to the saddle-shaped connecting elements 56. As likewise explained previously, the second profile body 30 has an opening 20 of similar configuration as that of the first profile body 10, so that the opening 20 extends from the first profile body 10 to the second profile body 30. The assembly unit 34, in this example the inertia belt reel 36, is arranged in the receiving body 32 and is located for the greatest part in the hollow space 62. In addition, the inertia belt reel 36 is fastened to a fastening plate 64 which is screwed onto the second profile body 30 from the outside. Consequently, the opening 20 of the support element 12 is again largely closed by the receiving body 32 and by the fastening plate 64.

For assembling the support structure 60 according to the present disclosure, the receiving body 32 is initially pre-positioned in the opening 20 of the first profile body 10 which can be achieved for example in that the receiving body 32 has a slight oversize relative to the opening 20, so that a frictional connection is created. Following this, the first profile body 10 is fastened to the saddle-shaped connecting element 56, for example by way of welding (see FIGS. 4A and 4B). These two steps can also be carried out in reverse order.

Depending on the shape of the inertia belt reel 36, the same can be initially introduced into the receiving body 32 and connected to the same before the second profile body 30 is fastened to the saddle-shaped connecting element 56 and to the first profile body 10, for example likewise by way of welding, as a result of which the hollow space 62 is closed. However it is likewise that the inertia belt reel 36 is already arranged on the fastening plate 64, which is initially screwed to the second profile body 30 or fastened to the second profile body 30 in another way and the inertia belt reel 36 is introduced into the receiving body 32 and consequently into the hollow space 62 only by way of the fastening of the second profile body 30 to the saddle-like connecting element 56. In the shown example, the fastening plate 64 is supported on the outside on the second profile body 30 and can be screwed to the second profile body 30 and also to the receiving body 32 using the bores 46, 51 (see FIGS. 2A and 2B).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for assembling a support structure comprising:
providing a support element including a first profile body configured to enclose a hollow space, the first profile body having a first surface and a second surface extending from a first longitudinal edge of the first surface, the first surface having an opening formed therein and delimited by a first boundary face and a second boundary face;
inserting the receiving body into the opening in such a manner that a first wall portion engages the first boundary face, a second wall portion substantially parallel to the first wall portion engages the second boundary face, a first fastener portion extending laterally outward from the first wall portion and a second fastener portion extending laterally outward from the second wall portion engage a second longitudinal edge of the first surface to positively position the receiving body in the opening of the first profile body, and a third wall portion extending between the first and second wall portions is in spaced relation to the first surface; and
fastening the receiving body to the support element.

2. The method according to claim 1 further comprising: fastening a second profile body to the first profile body.

3. The method according to claim 1, further comprising: inserting an assembly unit into the receiving body; and fastening the assembly unit to the receiving body.

4. A support structure for absorbing forces in a vehicle, comprising:
a support element including a first profile body configured to enclose a hollow space, the first profile body having a first surface and a second surface extending from a first longitudinal edge of the first surface, the first surface having an opening formed therein and delimited by a first boundary face and a second boundary face;
a receiving body for an assembly unit inserted into the opening and configured to at least partly project into the hollow space, the receiving body comprising:
a first wall portion in contact with the first boundary face; and
a second wall portion substantially parallel to the first wall portion and in contact with the second boundary face;
a third wall portion extending between the first and second wall portions in spaced relation to the first surface of the support element;
a first fastener portion extending laterally outward from the first wall portion;
a second fastener portion extending laterally outward from the second wall portion;
wherein the first and second fastening portions engage a second longitudinal edge of the first surface to positively position the receiving body in the opening of the support element.

5. The support structure according to claim 4, wherein the assembly unit comprises an inertia belt reel.

6. A vehicle, comprising a support element according to claim 4.

7. The support structure according to claim 4, wherein the first and second wall portions engage the first and second boundary faces in a frictionally joined manner when the receiving body is inserted into the opening.

8. The support structure according to claim 4, wherein the first and second fastening portions are fastened to the support element.

9. The support structure according to claim 8, wherein the first and second fastening portions comprise at least one bore for fastening the receiving body to the support element.

10. The support structure according to claim 4, wherein the support element comprises a second profile body fastened to the first profile body in contact with the first and second wall portions of the receiving body.

11. The support structure according to claim 10, wherein the receiving body further comprises:
   a third fastening portion extending laterally outward from the first wall portion opposite the third wall portion; and
   a fourth fastening portion extending laterally outward from the second wall portion opposite the third wall portion;
   wherein the second profile body engages the third and fourth fastening portions when the receiving body is inserted into the opening.

12. The support structure according to claim 4, wherein the receiving body further comprises:
   a third fastening portion extending laterally outward from the first wall portion opposite the first fastening portion; and
   a fourth fastening portion extending laterally outward from the second wall portion opposite the second fastening portion;
   wherein the second surface of the first profile body engages the third and fourth fastening portions when the receiving body is inserted into the opening.

13. The support structure according to claim 4, wherein the receiving body further comprises:
   a third fastening portion extending laterally inward from the first wall portion opposite the first fastening portion; and
   a fourth fastening portion extending laterally inward from the second wall portion opposite the second fastening portion; and
   a fourth wall portion extending from the third wall portion between the first and second wall portions;
   wherein the fourth wall portion engages the third and fourth fastening portions.

14. The support structure according to claim 13, wherein the fourth wall portion terminates at a fifth fastening portion engaging the second surface of the first body profile.

* * * * *